United States Patent [19]
Kawamoto

[11] Patent Number: 5,686,992
[45] Date of Patent: Nov. 11, 1997

[54] THREE-DIMENSIONAL PROCESSING DEVICE

[75] Inventor: Meitetsu Kawamoto, Tokyo, Japan

[73] Assignee: Petio Co., Ltd., Japan

[21] Appl. No.: 625,534

[22] Filed: Mar. 28, 1996

[30] Foreign Application Priority Data

Apr. 1, 1995 [JP] Japan ................... 7-003837 U

[51] Int. Cl.[6] .................................. G01B 11/24
[52] U.S. Cl. ........................................ 356/376
[58] Field of Search ................ 356/376; 354/290, 354/291, 292

[56] References Cited

U.S. PATENT DOCUMENTS 5,159,367   10/1992   Fusi ............................. 354/290

FOREIGN PATENT DOCUMENTS 2940636   4/1981   Germany ..................... 354/292
5-126549  5/1993   Japan .......................... 356/376
1605039  12/1981   United Kingdom ......... 354/292
WO 89/07750  8/1989   WIPO ..................... 356/376

*Primary Examiner*—F. L. Evans
*Attorney, Agent, or Firm*—Andrus, Sceales, Starke & Sawall

[57] ABSTRACT

The present invention provides a three-dimensional processing device that can measure three-dimensionally the contour of a person's face including hair by laser beams without necessity for the measured person to move or to fit into the specific line for measuring. In order to fix a person in a predetermined position, a positioning means, for example, a backboard 10 is fixed. Positioning is performed by the person leaning against the backboard 10 or by providing a concave part 13 on the backboard 10 and fitting the person's shoulder into the concave part 13. A laser scanner 20 is installed on a scanner stand 22 so that it is possible to move it forward, backward, up, down, left and right. Further, it is possible to distinguish the backboard 10 from hair from which laser beams are not reflected by making the backboard 10 black or almost black so that it is possible to measure a shape by reflection when the laser beams are directed onto the surfaces.

4 Claims, 5 Drawing Sheets

THREE-DIMENSIONAL PROCESSING DEVICE

BACKGROUND OF THE INVENTION

1. Field of the Invention

This invention relates to a three-dimensional processing device, and more particularly to a three-dimensional processing device for measuring three-dimensionally the contour of a person's face, for engraving three-dimensionally the face on a plate made of precious metals such as platinum, plastic or the like and for applying the plate on the dial of a watch, or the surface of an accessory such as a bracelet or a pendant.

2. Description of the Related Art

Hitherto, a method and a device for measuring three-dimensional information of a measured subject by an optical projecting method, an optical cutting method or the like are known (for example, Japanese Published Unexamined Utility Model Application Number Showa 58-162011 and Japanese Published Examined Patent Application Number Heisei 6-29709).

The data thereof is used for a test to inspect three-dimensionally without touching the measured subject, for example, whether beveling formed at the end of a steel pipe is normal or not, or whether a product is made according to a standard and for a measuring instrument for measuring surface roughness of the product and the like.

Therefore, the present applicant proposed previously an automatic engraving device for measuring three-dimensionally the contour of a person's face whereby it was possible to measure three-dimensionally without touching with the measured subject and for engraving correctly the person's face on the surface of a coin by using the measured data (Japanese Published Unexamined Patent Application Number Heisei 2-303900).

In this application, the person's face was measured by using two industrial TV cameras, the distances between these two industrial TV cameras and the face were obtained by difference of angles from the two industrial TV cameras, and the unevenness of the face was measured.

However, the position of the face had to be fixed for measuring, so until now the center line has been drawn on the monitor screen on which the face appeared and the measured person had to hold himself to the line for predetermined time. Therefore, a child, an elderly person and the like were hard to fit and there was an unsuitable aspect as a product.

As with the conventional three-dimensional measuring device using laser beams which are detected by reflection of the laser beams by the measured subject, there was a disadvantage that it was impossible to measure because it was impossible to distinguish the measured subject such as hair by which the laser beams are not reflected from a background by which the laser beams were reflected.

SUMMARY OF THE INVENTION

Therefore, an object of the present invention is to provide a three-dimensional processing device that can measure sufficiently even if the measured person is at an arbitrarily predetermined position to some extent and can detect hair clearly, and can process a person's face three-dimensionally.

In order to achieve the object, in the three-dimensional processing device according to the present invention, a person's face is fixed at the predetermined position by a positioning means, a laser scanner is installed on a scanner stand in a manner allowing the scanner to move forward, backward, up, down, left and right, the contour of a person's face is measured three-dimensionally by laser beams projected from two laser projecting portions provided in the laser scanner, image processing of measured data is performed by a computer and the person's face is processed three-dimensionally on a plate by a three-dimensional engraving machine using the data in which the image processing has been performed.

The backboard is of a reflective matter so that it is possible to distinguish the backboard from hair that will not reflect the laser beams when the laser beams are directed onto the surfaces. Further, the backboard is black or almost black so that natural light, illuminating light and so on in a room is not reflected irregularly.

Further, positioning may be performed by providing a concave part on the backboard and by fitting the person's shoulder into the concave part.

Operation:

According to the three-dimensional processing device of the present invention as above mentioned, after the measured person is at the predetermined position and is positioned by fitting the shoulder into the concave part of the backboard, an operator moves the laser scanner to the position fitted to the person.

When the laser beams are projected from two laser projecting portions, each laser beam is reflected by the face, unevenness is detected by two reflective angles and the three-dimensional shape of the face is measured.

Further, though the laser beams are not reflected by the hair, the laser beams are reflected by the backboard and, because the backboard is spaced from the person's face, it is distinguished satisfactorily, therefore, it is possible to measure three-dimensionally the person's face correctly.

The person's face is processed three-dimensionally on a plate by a three-dimensional engraving machine based on three-dimensional measurement of the data. Further, the plate on which the person's face is engraved is applied to the dial of a watch, or to the surface of a bracelet, a pendant or the like.

DESCRIPTION OF THE PREFERRED EMBODIMENT

An embodiment of the present invention will be described referring to drawings.

Figure 1:
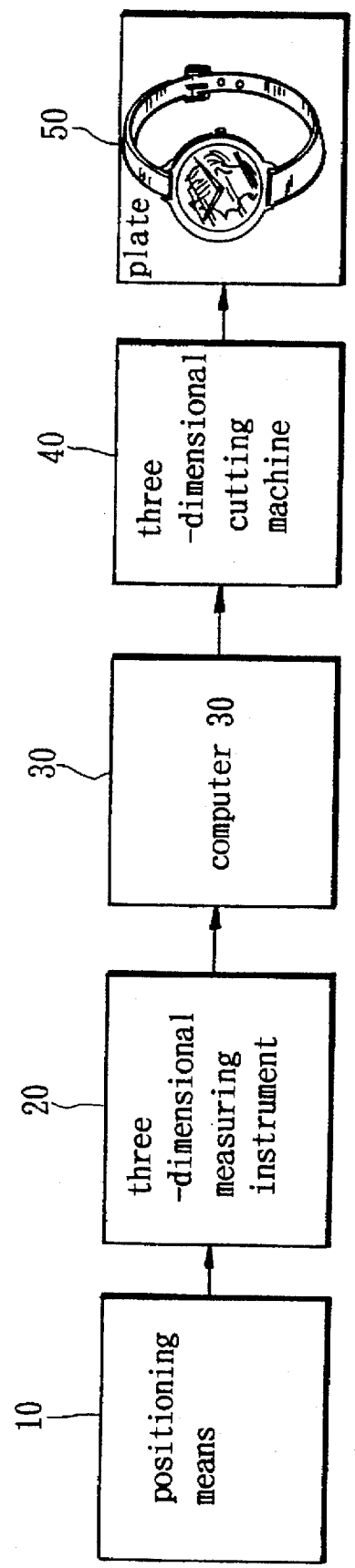
FIG. 1 is a block diagram showing an embodiment of a three-dimensional processing device according to the present invention.

FIG. 1 is a block diagram showing one embodiment of a three-dimensional processing device according to the present invention. In FIG. 1, reference numeral 10 designates positioning means to fix a person to be measured to a predetermined position so that it is possible to measure the person correctly, reference numeral 20 designates a three-dimensional measuring instrument with which it is possible to measure the contour of a person's face with laser beams, reference numeral 30 designates a computer to perform image processing of data derived from measurement by the three-dimensional measuring instrument 20, reference numeral 40 designates a three-dimensional engraving machine with which it is possible to process three-dimensionally the contour of the measured person's face on the desired plate 50 based on the processed data, and it is possible to apply it to, for example, a dial of a watch by using the plate 50.

Figure 2:
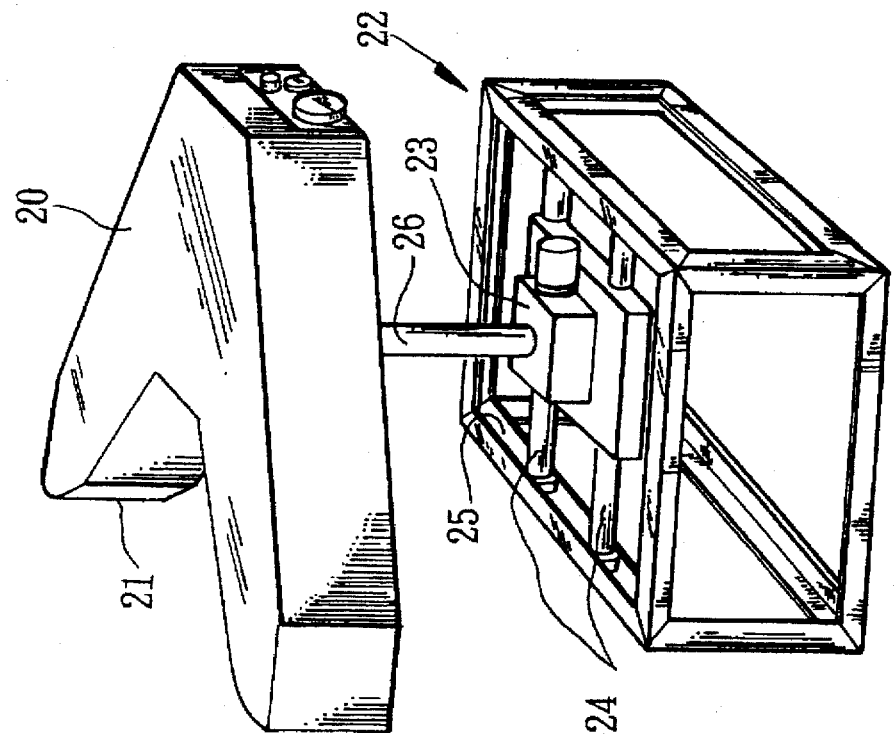
FIG. 2 is a perspective view showing the relation between a backboard as positioning means 10 and a laser scanner as a three-dimensional measuring instrument 20.
Figure 2:
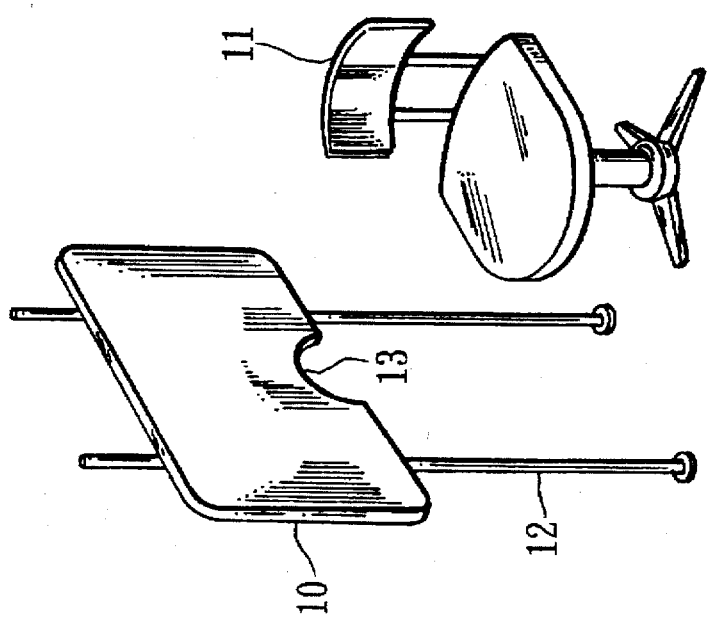

FIG. 2 is a perspective view showing the relation between a back board as the positioning means 10 and a laser scanner as the three-dimensional measuring instrument 20.

Generally speaking, even if the to be measured person sits on a chair 11 at the predetermined position, the position of the face depends on the sitting posture such as bending forward or backward. Therefore, it is necessary for the measured person to move his face to the predetermined position by himself.

Therefore, in the present invention, the backboard 10 is fixed to the position at which the person will possibly lean, and positioning is performed by contacting a part of a body such as the head and a shoulder with the backboard 10. Or the backboard 10 is provided with a concave part 13 and it is possible to eliminate a gap in a position by fitting the shoulder of the measured person P into the concave part 13. Even if positioning the shoulder by providing the concave part 13, it is needless to say that fixing may be also performed by contacting a part of the head and the body with the backboard.

Though the three-dimensional measuring instrument 20 is arbitrary, for example, "Bocseran", a trademark, produced by Hamano Engineering Co., Ltd. may be used. In the embodiment, the laser scanner provided with an industrial TV camera (not shown) and two laser beam projecting portion 21 is illustrated.

The laser scanner 20 is made up so that it is possible for it to move forward, backward, up, down, right and left it to a scanner stand 22. Though the scanner stand 22 may be provided with a caster or the like as a means for allowing it to move forward, backward, up, down, right and left, in the illustrated embodiment, base metal fittings 23 are provided so that it is possible for it to move forward and backward by sliding on two arms 24 and 24 by using a stepping motor or the like, and the base metal fittings 23 and the arm 24 are in a body which can move right and left on a groove on the upper surface of the scanner stand 22. Further, vertical moving is caused by vertically moving a support 26 supporting the laser scanner 20.

A method to engrave three-dimensionally the person's face on the surface of precious metals by using the three-dimensional processing device of the present invention will be described referring to FIG. 3 as follows.

Figure 3:
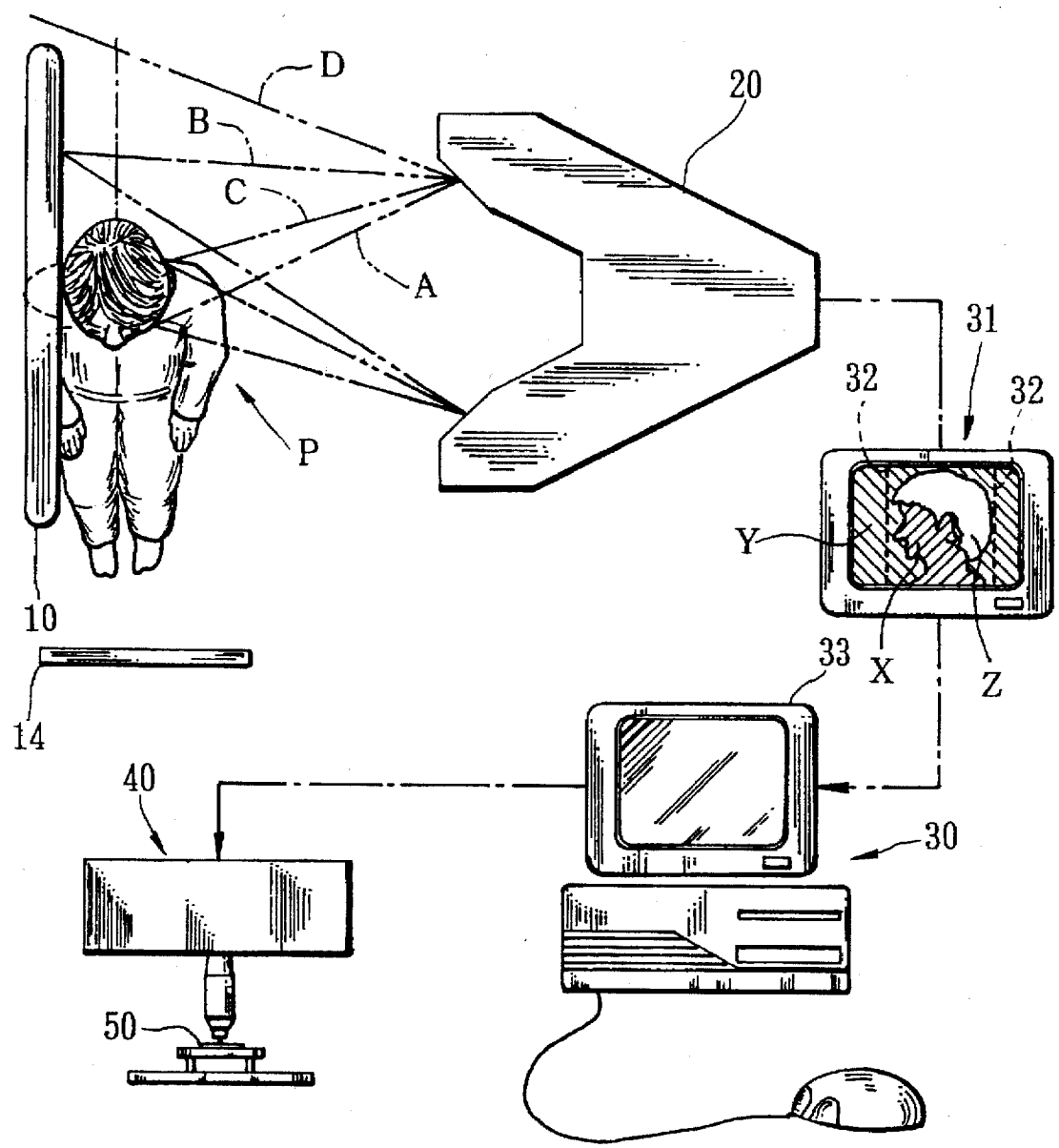
FIG. 3 is a schematic view of incorporating compactly a backboard 10, a laser scanner 20, a computer 30, a engraving machine 40, and an operating board for an operator and the like into one unit.

FIG. 3 is a schematic view of incorporating compactly the backboard 10, the laser scanner 20, the computer 30, the engraving machine 40, an operating board for an operator into a unit. At first the person P sits down on a chair in front of the backboard 10 to contact a part of the body with the backboard 10 and/or to fit the measured person's shoulder into the concave part 13.

Next the operator moves the laser scanner 20 forward, backward, up, down, right and left on the scanner stand 22 so that the measured person's face is between two lines 32 and 32 showing a range that is possible to be measured on the monitor screen 31. Then measuring is started by projecting the laser beams from two laser beam projecting portions 21.

Then the laser beams A directed to the part of face are reflected and are indicated as X on the monitor screen 31 and the laser beams B directed to the backboard 10 are indicated as Y. However, though the laser beams C directed to a part of hair are not indicated as Z on the monitor screen because they are not reflected, if it is assumed that a part which is not indicated between the face and the backboard is hair, it will be also possible to detect the hair. Still, though the laser beams D to the outside of the backboard 10 are not reflected, it is possible to distinguish them from the hair due to the laser beams D lying outside of the backboard 10.

So far as such detected image, if a part of the data is damaged by influence of light, different reflection or the like, then necessary correction is performed an operation to enlarge, or reduce the data is performed according to the shape of each plate as mentioned below. After that, the processed data is checked on a computer screen 33 and is transferred into a floppy disc, and the face of the measured person P is processed three-dimensionally on the plate 50 by a three-dimensional cutting machine 40. Naturally it may still be possible to process data on the computer screen 33 without using the monitor screen 31.

Though reference numeral 14 designates a monitor screen provided in front of the measured person P and is installed to make sure how the measured person P appears to himself, when the measured person can not concentrate to prevent movement of his head and so on, the monitor screen 14 may be removed.

Though precious metals such as gold, silver and platinum are mainly used as the plate, it is also possible to use glass, plastic, a stone such as a gravestone, or wood such as a mortuary tablet, as the need arises.

Further, a circle, an ellipse, a four-sided figure such as a square and a rectangle, a diamond shape, a star shape and a polygon such as a hexagon and an octagon are also possible for the shape of the plate.

Figure 4:
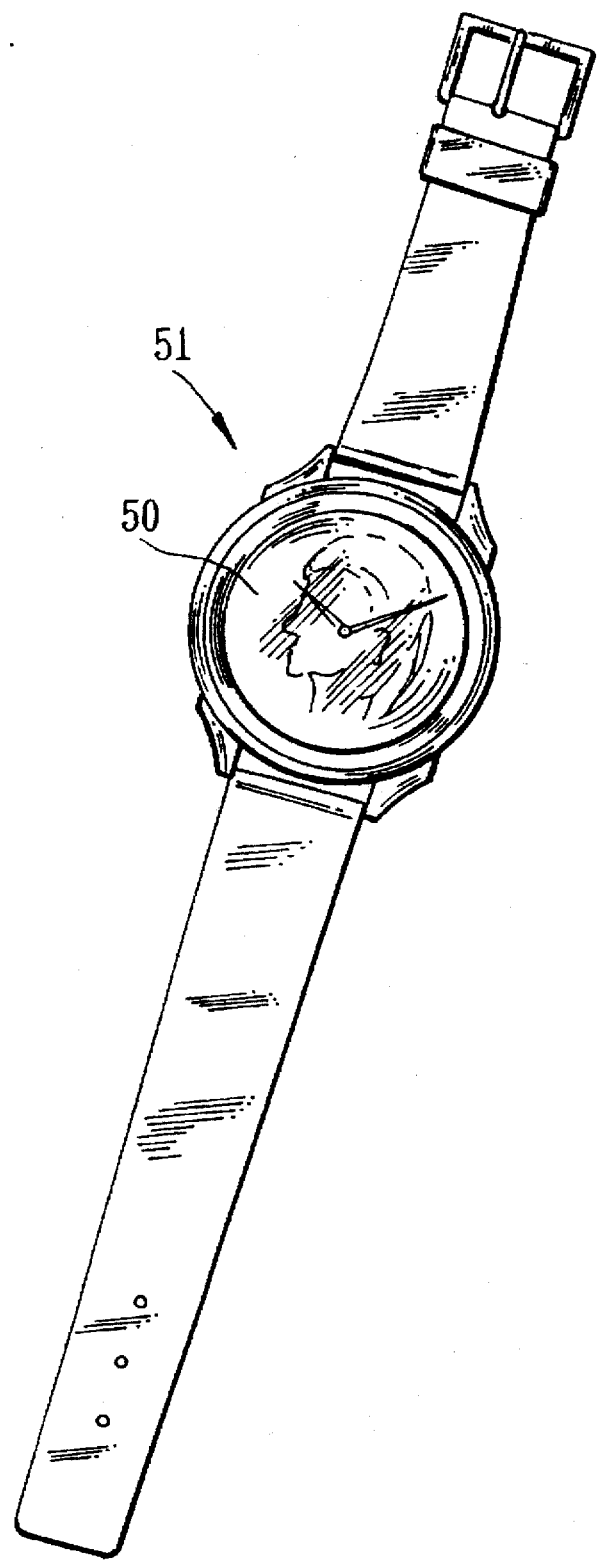
FIG. 4 is a plan view of using a plate for a dial of a watch.
Figure 5:
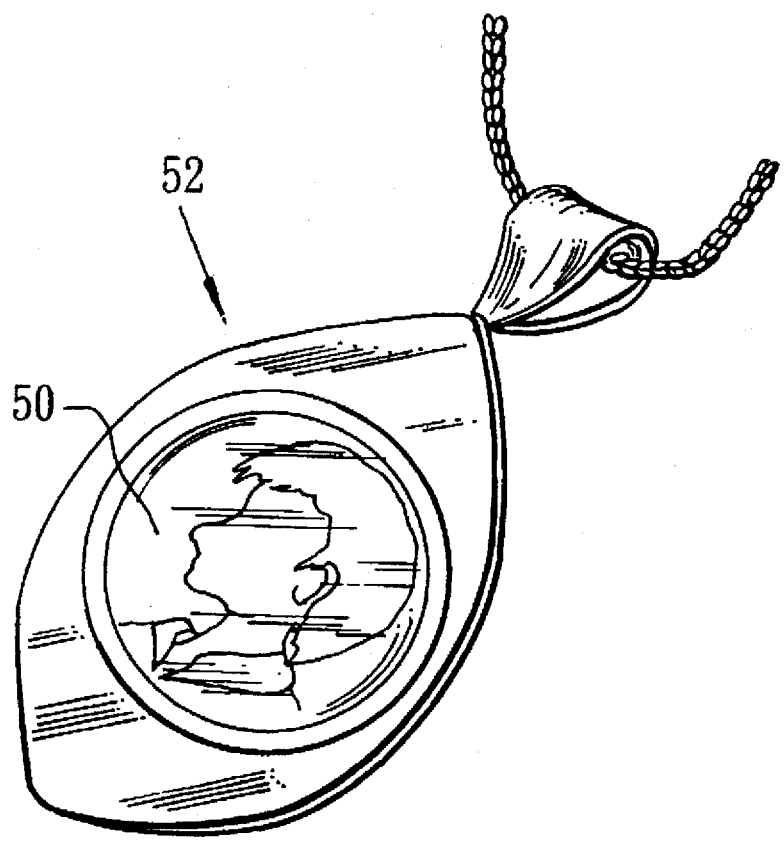
FIG. 5 is a perspective view of using a plate on one side of surfaces of a brooch.

If this plate is used as the dial of the watch, for example, as shown in FIG. 4 or is used on one side of a brooch as shown in FIG. 5, an advantage is that it is possible to get only one original product in the world.

Further, it is possible to use the plate for a wide range such as a pendant, a brooch, a bracelet, a ring, a wristwatch, a clock, a wall clock, a desk lamp, a tie pin, cuff links, a band, a button, a golf marker or the like, and it is possible to use it for any product on which a face of the very person, one's love, parents or a teacher is engraved.

As shown in FIG. 3, if the backboard 10, the laser scanner 20, the computer 30, the cutting machine 40, the board for the operator and so on can be incorporated compactly into one unit, an advantage is that anyone can use easily the unit when installed in each kind of exhibition hall, a square for an event, an amusement park, theme park, a wedding hall and an airport, and in a department store and so on.

Effect of the Invention:

In a three-dimensional processing device according to the present invention, since a measured person's face is fixed by using positioning means when measuring three-dimensionally the contour of a the person's face by laser beams projected from a laser beam projecting portion, it is possible to measure correctly. Further, there are advantages in that, since the laser scanner can be moved forward, backward, up, down, left and right on a scanner stand, the measured person need not fit himself by moving the laser scanner with an operator and even a child and an elderly person can use.

Using a backboard fixed at the predetermined position as the positioning means, anyone can position oneself easily only by leaning it. Further, providing a concave part on the backboard and fitting the person's shoulder into the concave part, an advantage is that it is easy to fix the position of oneself.

Further, making the backboard colored black or almost black so that it is possible to measure a shape by reflecting when the laser beams are directed onto the surfaces, it is possible to detect and distinguish the backboard from the background of the face. Therefore, an advantage is to detect correctly the person's face, that previously has not been measured correctly because it has not been possible to distinguish hair which the laser beams have not reflected from the background, by assuming as the hair the area over which the laser beams are not reflected between the face and the backboard.

What is claimed is:

1. A three-dimensional processing device comprising:

a backboard fixed at a predetermined position with respect to a person's face;

means for mounting a laser scanner on a scanner stand for movement forward, backward, up, down, left and right;

means for measuring three-dimensionally the contour of the person's face by detecting reflected light from laser beams projected from two laser projecting portions provided in the laser scanner onto the person's face and hair and the backboard to provide three-dimensional image data representative of the face contour, data representative of the backboard and data representative of unreflected light from the person's hair;

means for performing image processing of the measured data by a computer to provide processed image data; and, a three-dimensional engraving machine utilizing the processed image data to produce three-dimensionally the person's face on a plate.

2. A three-dimensional processing device as in claim 1 wherein the backboard is made of substantially black material.

3. A three-dimensional processing device as in claim 1, wherein the backboard is provided with a concave part for receipt of the person's shoulder to establish the predetermined position.

4. A three-dimensional processing device as in claim 1 wherein said backboard includes means for establishing the predetermined position of the person.

* * * * *